United States Patent [19]

McIntyre

[11] Patent Number: 4,867,828

[45] Date of Patent: Sep. 19, 1989

[54] METHOD OF IN-LINE PRODUCTION OF SUCCESSIVE BARRIER-AND SILICONE-COATED INEXPENSIVE POROUS AND ABSORBENT PAPER AND SIMILAR SUBSTRATES, AND PRODUCTS PRODUCED THEREBY

[75] Inventor: Frederic S. McIntyre, Wellesley, Mass.

[73] Assignee: Acumeter Laboratories, Inc., Marlborough, Mass.

[21] Appl. No.: 115,707

[22] Filed: Nov. 2, 1987

[51] Int. Cl.⁴ .................................................... B32B 31/12
[52] U.S. Cl. ........................................ 156/247; 427/44; 427/54.1; 427/208.2; 427/208.8; 427/411; 156/273.3; 156/289; 156/344; 428/352; 428/447
[58] Field of Search .................. 428/345, 352; 427/44, 427/54.1, 208.2, 208.8, 411; 156/247, 273.3, 289, 344

[56] References Cited

U.S. PATENT DOCUMENTS

| | | | |
|---|---|---|---|
| 3,595,204 | 7/1971 | McIntyre et al. | 118/8 |
| 4,287,255 | 9/1988 | Wong et al. | 428/345 X |
| 4,288,479 | 9/1981 | Brack | 428/345 X |
| 4,288,497 | 9/1981 | Tanaka et al. | 427/411 X |
| 4,358,494 | 11/1982 | Akimoto et al. | 428/345 X |
| 4,443,491 | 4/1984 | McInyre | 427/44 |
| 4,537,811 | 8/1985 | Nablo | 428/166 |
| 4,629,634 | 12/1986 | Coughlan et al. | 427/208.8 X |

*Primary Examiner*—George F. Lesmes
*Assistant Examiner*—M. A. Kat
*Attorney, Agent, or Firm*—Shapiro and Shapiro

[57] ABSTRACT

A method of producing silicone-coated release papers, labels and tapes and the like in an in-line procedure through the use of a radiation-insensitive hot melt barrier coating on poor porous and highly absorbent paper substrates, and upon which barrier coating a silicone coating is radiation cured.

5 Claims, 3 Drawing Sheets

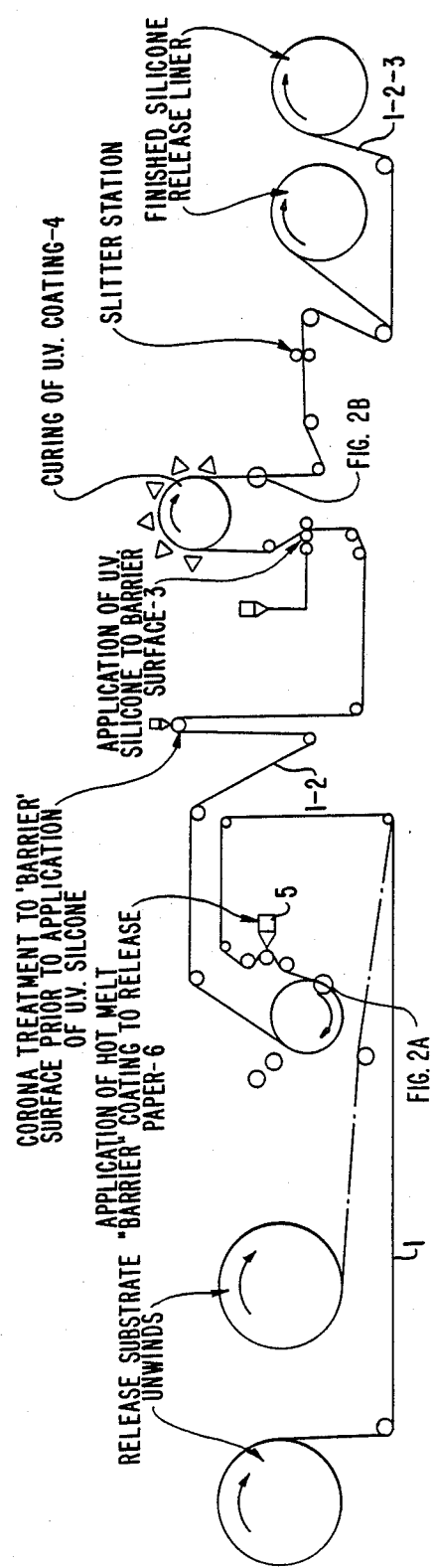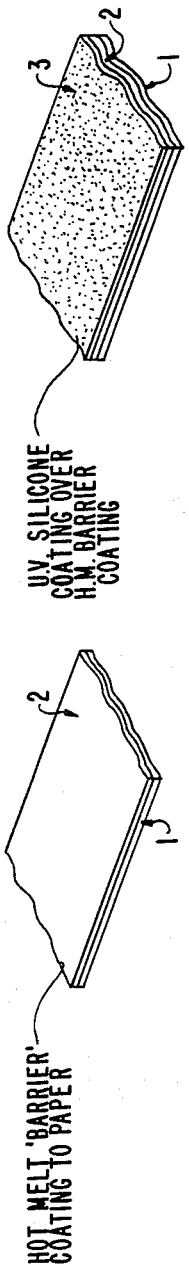

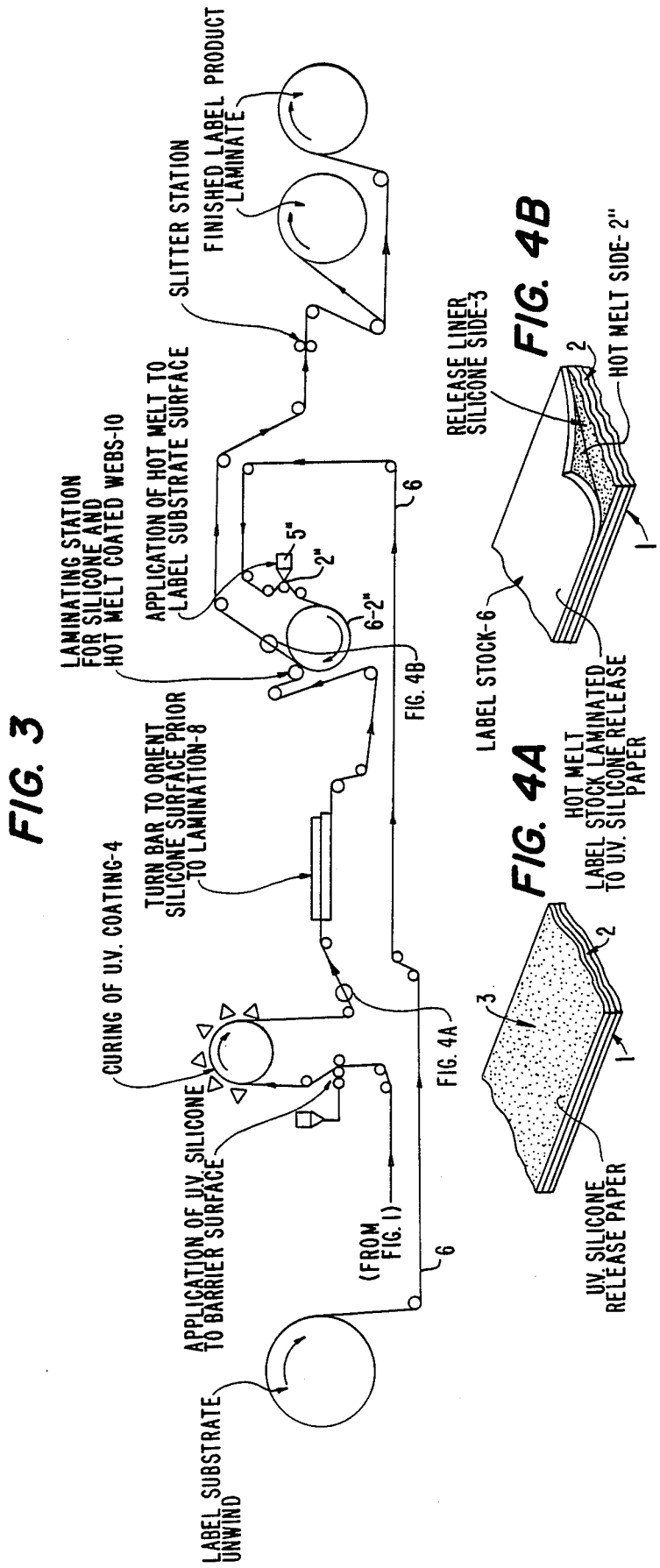

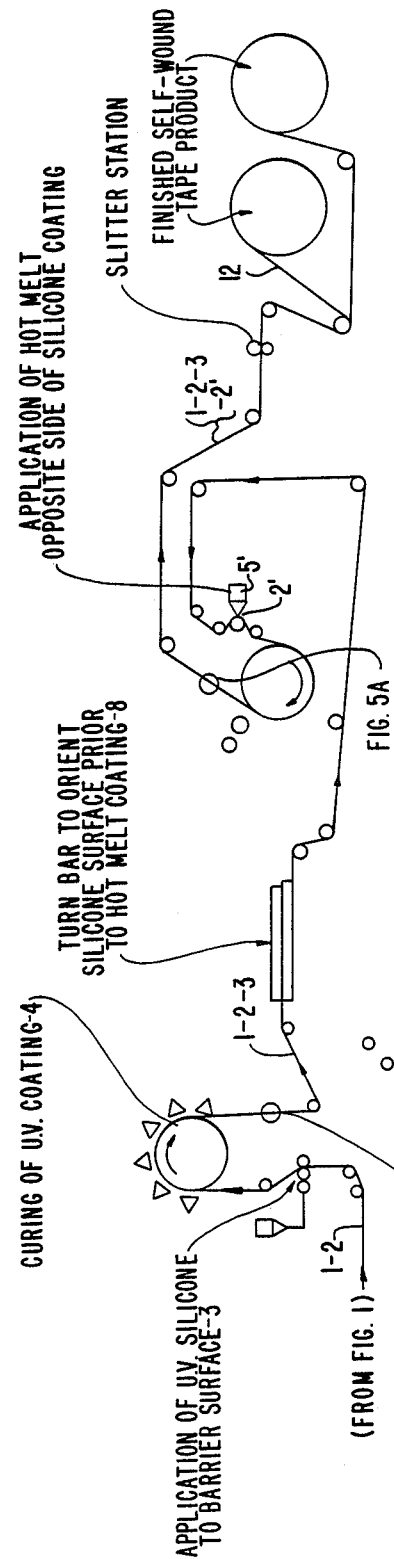
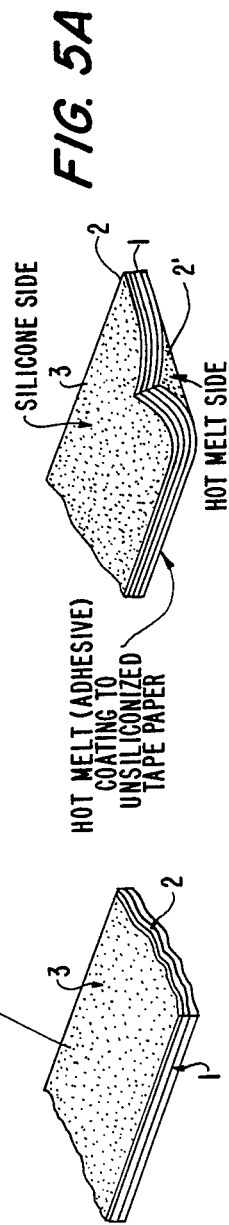
FIG. 5
FIG. 5A

METHOD OF IN-LINE PRODUCTION OF SUCCESSIVE BARRIER-AND SILICONE-COATED INEXPENSIVE POROUS AND ABSORBENT PAPER AND SIMILAR SUBSTRATES, AND PRODUCTS PRODUCED THEREBY

The present invention relates to techniques for moisture-barrier coating with relatively low viscosity non-radiation-sensitive hot melts, and superposed radiation-curable silicone coating, of low-cost porous and absorbent paper and similar substitutes, and in a single in-line pass, as distinguished from current technology requiring both better grades of paper or the like and separate production passes for the barrier coating, as with relatively high viscosity radiation-sensitive barrier polyethelenes and the like, followed by a subsequent silicone coating and radiation curing pass. The invention also relates to the novel very inexpensive release paper, adhesive label and tape and similar products that the method makes feasible for the first time.

Particularly in developing countries that have low cost materials, such as poor grade porous and highly absorbent paper materials and the like, and also elsewhere where extremely inexpensive products are desired, it is important to enable the production of silicone-coated release papers and other products with indigenous, though inferior, raw and low-cost materials, not heretofore considered useable for such purposes. Prior processes requiring far better papers have also required barrier coating with such very high temperature, high viscosity radiation-curable and sensitive coating materials as the before-mentioned polyethelenes and the like (viscosity of the order of $10^6$ centipoise), and have also required that the barrier coating be applied in a first production pass, generally radiation-cured (usually ultra violet or electron beam) and then wound up. (See, for example, U.S. Pat. Nos. 4,537,811 and 4,443,491). The roll is then subsequently unwound and passed to a second and separate production step for coating with silicone, followed by a further radiation curing step which introduces the problem of rendering the underlying radiation-sensitive cured barrier coating subject to potential deleterious effects, including stiffening of the same with resultant degradation in the flexibility of the product.

The invention, accordingly, is concerned with a process that will enable superior silicone-coated products to be produced despite the use of poor porous papers, and with a single less expensive in-line barrier coating-silicone coating process, using less expensive and less sensitive barrier coating materials, as well. This has been found possible through the use of relatively low viscosity (order of $10^5$ centipoise) inexpensive bulk-fed hot melt materials containing wax-like properties and that permeate the porous paper substrate and, generally without requiring radiation, readily integrate and harden or set with the same as a most effective barrier coating adapted immediately to be fed in-line for silicone coating upon the set barrier coating and then for radiation curing of the silicone, and without any deleterious degradation or other effect upon the barrier-coated paper substrate which is non-radiation sensitive or polymerizable.

An object of the present invention, accordingly, is to provide a new and improved method of barrier coating and superposed silicone coating of inexpensive and relatively poor quality porous and highly absorbent papers and the like and in a single in-line process.

A further object is to provide by such process a most satisfactory conversion of such poor base materials into superior and novel silicone-coated products including release papers, tapes and labels, among others.

Other and further objects will be explained hereinafter and are more particularly delineated in the appended claims.

In summary, however, from one of its view points, the invention embraces a method of producing a silicone coating on a porous and highly moisture-absorbent paper substrate in an in-line procedure, that comprises, applying a barrier coating of a radiation-insensitive wax-like hot melt material to one side of the substrate; following integrating with and setting of such coating on the substrate, applying thereupon, in-line, a further coating of radiation-curable silicone; and radiation-curing said further silicone coating upon and to the set barrier coating. Preferred and best mode embodiments and resulting novel products are later described.

The invention will be described with reference to the accompanying drawings, in which FIG. 1 shows the method underlying the invention as applied to the production of a silicone-coated release paper;

FIGS. 2A and 2B are isometric views showing the hot melt barrier coating and subsequent cured silicone coating on the resulting release paper product;

FIG. 3 is a view similar to FIG. 1 showing the use of the release paper of FIG. 2B with a hot melt coated label paper substrate;

FIG. 4A is a repetition of FIG. 2B;

FIG. 4B is a similar view of the use of the silicone-barrier porous paper as a release sheet with the hot melt or other adhesive-coated label substrate; and FIG. 5 illustrates the use of silicone-barrier product of FIG. 2B as a base for hot melt pressure-sensitive or other adhesive to form the tape product of FIG. 5A.

The heretofore unusable porous or poor quality absorbent paper 1 (including newspaper quality or non-densified Kraft-type papers or the like), FIG. 1, is shown coated, as with the aid of slot nozzle applicators 5, as of the type described in U.S. Pat. No. 3,595,204 or other coaters, with bulk-fed wax-like hot melt materials supplied at 6, such as, for example, radiation-insensitive Exxon Chemical Co. "Escorene" Type MU-2514 (ethyl vinyl-acetate wax-like pelleted polymer) and U.S.I. Chemicals Co. "Petrothene" Type N601, to permeate and integrate with the porous paper 1 and provide a reinforced unitary moisture barrier-coated substrate, FIG. 2A, that quickly sets or hardens. Through the employment of this type of barrier coating, the substrate is immediately ready to pass on, in-line, to a silicone coating station to apply the silicone at 3 upon the set barrier coating 2, and then to radiation-cure the same at 4, without any deletereous effects upon the barrier-coated substrate in view of the insensitivity to radiation of this type of barrier coating material, (and unlike prior radiation-sensitive polyethelene and similar barrier coating materials heretofore employed). The resulting silicone-barrier product is shown at 1-2-3 in FIG. 2B and in FIG. 4A. Suitable radiation-curable silicone coating materials are those of Goldschmidt Company; Types RC-450, RC-802 and RC-149, using U.V. photo-initiators such as Type A4; and a typical hot melt barrier coating thickness or weight for a porous Kraft-like paper of about 50–100 micron thickness is of the order of 15 microns (15 grams per square meter), and a silicone coating of the order of about 1–2 grams per square meter. It has further been found that the barrier coating of the above-described types further prevents migration of the silicone into the same or into the paper, and does not stiffen or become brittle under the silicone radiation curing treatment.

The resulting product 1-2-3, FIG. 2B, has been found to be an excellent silicone paper for such applications as a pressure-sensitive tape, FIG. 5A, having a hot melt or other adhesive 2' applied to the other side of the porous paper 1. In FIG. 5, this is effected by inverting the silicone-carrier-coated product 1-2-3 at 8 and applying a hot melt pressure-sensitive or other adhesive 2' at 5', such as a synthetic rubber-polymer hot melt as of the Shell Krayton 1320 type or the like, adhered to the opposite side of the barrier-silicone coated paper substrate. This tape will be self-windable at 12 in view of the release surface 3 supplied by the silicone coating.

The use of the product 1-2-3 as a release paper, FIGS. 2B and 4A, is also useful, as before-mentioned; the product 1-2-3 being shown in FIG. 3, turned over at turn bar station 8 and laminated at 10 with a label stock paper substrate or web 6 that has been coated with a hot melt pressure-sensitive or similar adhesive 2" at 5", so that the label paper carrying the adhesive 6-2" may be stripped or released from the silicone surface 3 of the product 1-2-3 as in FIG. 4B.

Further modifications and product uses will suggest themselves to those skilled in this art and such are considered to fall within the spirit and scope of the invention as defined in the appended claims.

What is claimed is:

1. A method of producing a silicone coating on a porous and highly moisture-absorbent paper substrate in an in-line procedure, comprising, in one pass, applying a barrier coating of radiation-insensitive hot melt material to one side of the substrate, said material having a low enough viscosity to permit the material to permeate the porous paper substrate; following integrating with and setting of such coating on the substrate, applying thereupon, in-line, a coating of radiation-curable silicone; and radiation-curing said silicone coating upon and to the set barrier coating.

2. A method as claimed in claim 1 in which the substrate is inverted and a pressure-sensitive hot melt adhesive is applied to the other side of the substrate.

3. A method as claimed in claim 1 in which a pressure-sensitive adhesive is applied to and set on another substrate, and said other substrate is laminated to the silicone-coated surface of the first-named substrate to permit winding of the same and subsequent stripping away and releasing of said other substrate from said first-named substrate.

4. A method as claimed in claim 1 in which said hot melt material has wax-like properties.

5. A method as claimed in claim 4 in which the viscosity of said hot melt material is of the order of $10^5$ centipoise.

* * * * *